(12) United States Patent
Eiselt

(10) Patent No.: US 7,440,164 B2
(45) Date of Patent: Oct. 21, 2008

(54) APPARATUS AND METHOD FOR RAMAN GAIN SPECTRAL CONTROL

(75) Inventor: Michael H. Eiselt, Middletown, NJ (US)

(73) Assignee: Pivotal Decisions LLC, Las Vegas, NV (US)

( * ) Notice: Subject to any disclaimer, the term of this patent is extended or adjusted under 35 U.S.C. 154(b) by 0 days.

(21) Appl. No.: 10/454,773

(22) Filed: Jun. 3, 2003

(65) Prior Publication Data

US 2004/0042068 A1    Mar. 4, 2004

Related U.S. Application Data

(60) Provisional application No. 60/385,921, filed on Jun. 4, 2002.

(51) Int. Cl.
*H01S 4/00*      (2006.01)
*H04B 10/12*     (2006.01)

(52) U.S. Cl. ..................................... 359/334
(58) Field of Classification Search .................. 359/334
See application file for complete search history.

(56) References Cited

U.S. PATENT DOCUMENTS

| | | | |
|---|---|---|---|
| 4,229,831 A | 10/1980 | Lacher | |
| 4,535,459 A | 8/1985 | Hogge, Jr. | |
| 4,636,859 A | 1/1987 | Vernhet et al. | |
| 4,710,022 A | 12/1987 | Soeda et al. | |
| 5,224,183 A | 6/1993 | Dugan | |
| 5,225,922 A | 7/1993 | Chraplyvy et al. | |
| 5,267,071 A | 11/1993 | Little et al. | |
| 5,299,048 A | 3/1994 | Suyama | |
| 5,321,541 A | 6/1994 | Cohen | |
| 5,455,703 A | 10/1995 | Duncan et al. | |
| 5,559,625 A | 9/1996 | Smith et al. | |
| 5,613,210 A | 3/1997 | Van Driel et al. | |
| 5,726,784 A | 3/1998 | Alexander et al. | |
| 5,737,118 A | 4/1998 | Sugaya et al. | |
| 5,778,116 A | 7/1998 | Tomich | |
| 5,790,285 A | 8/1998 | Mock | |
| 5,812,290 A | 9/1998 | Maeno et al. | |
| 5,877,881 A | 3/1999 | Miyauchi et al. | |
| 5,903,613 A | 5/1999 | Ishida | |

(Continued)

FOREIGN PATENT DOCUMENTS

JP         01115230        5/1989

(Continued)

OTHER PUBLICATIONS

Merriam-Webster-s Collegiate Dictionary, 10 th ed., Merriam-Webster Inc., Springfield Mass. , p. 731, (1998).*

(Continued)

*Primary Examiner*—Eric Bolda
(74) *Attorney, Agent, or Firm*—Woodcock Washburn LLP

(57) ABSTRACT

The invention pertains to optical fiber transmission systems, and is particularly relevant to optical transport systems employing Raman optical amplifiers. In particular the invention teaches an apparatus and method to provide initial tuning of a Raman pump module. In the present invention, improvements to Raman gain control are taught in order to provide for an advantageous Raman gain spectral profile.

30 Claims, 2 Drawing Sheets

U.S. PATENT DOCUMENTS

| | | | |
|---|---|---|---|
| 5,914,794 | A | 6/1999 | Fee et al. |
| 5,914,799 | A | 6/1999 | Tan |
| 5,936,753 | A | 8/1999 | Ishikawa |
| 5,940,209 | A | 8/1999 | Nguyen |
| 5,963,350 | A | 10/1999 | Hill |
| 5,995,694 | A | 11/1999 | Akasaka et al. |
| 6,005,702 | A | 12/1999 | Suzuki et al. |
| 6,021,245 | A | 2/2000 | Berger et al. |
| 6,038,062 | A | 3/2000 | Kosaka |
| 6,075,634 | A | 6/2000 | Casper et al. |
| 6,078,414 | A | 6/2000 | Iwano |
| 6,081,360 | A | 6/2000 | Ishikawa et al. |
| 6,084,694 | A | 7/2000 | Milton et al. |
| 6,088,152 | A | 7/2000 | Berger et al. |
| 6,108,074 | A | 8/2000 | Bloom |
| 6,122,095 | A | 9/2000 | Fatehi |
| 6,151,334 | A | 11/2000 | Kim et al. |
| 6,157,477 | A | 12/2000 | Robinson |
| 6,160,614 | A | 12/2000 | Unno |
| 6,163,392 | A | 12/2000 | Condict et al. |
| 6,163,636 | A | 12/2000 | Stentz et al. |
| 6,173,094 | B1 | 1/2001 | Bowerman et al. |
| 6,177,985 | B1 | 1/2001 | Bloom |
| 6,198,559 | B1 | 3/2001 | Gehlot |
| 6,229,599 | B1 | 5/2001 | Galtarossa |
| 6,236,481 | B1 | 5/2001 | Laor |
| 6,236,499 | B1 | 5/2001 | Berg et al. |
| 6,246,510 | B1 | 6/2001 | BuAbbud et al. |
| 6,259,553 | B1 | 7/2001 | Kinoshita |
| 6,259,554 | B1 | 7/2001 | Shigematsu et al. |
| 6,259,693 | B1 | 7/2001 | Ganmukhi et al. |
| 6,259,845 | B1 | 7/2001 | Sardesai |
| 6,272,185 | B1 | 8/2001 | Brown |
| 6,275,315 | B1 | 8/2001 | Park et al. |
| 6,288,811 | B1 | 9/2001 | Jiang et al. |
| 6,288,813 | B1 | 9/2001 | Kirkpatrick et al. |
| 6,307,656 | B2 | 10/2001 | Terahara |
| 6,317,231 | B1 | 11/2001 | Al-Salameh et al. |
| 6,317,255 | B1 | 11/2001 | Fatehi et al. |
| 6,323,950 | B1 | 11/2001 | Kim et al. |
| 6,327,060 | B1 | 12/2001 | Otani et al. |
| 6,356,384 | B1 | 3/2002 | Islam |
| 6,359,729 | B1 | 3/2002 | Amoruso |
| 6,388,801 | B1 | 5/2002 | Sugaya et al. |
| 6,396,853 | B1 | 5/2002 | Humphrey et al. |
| 6,519,082 | B2 * | 2/2003 | Ghera et al. ............ 359/341.4 |
| 6,532,101 | B2 * | 3/2003 | Islam et al. ................. 359/334 |
| 6,611,370 | B2 * | 8/2003 | Namiki et al. ............. 359/334 |
| 6,624,926 | B1 * | 9/2003 | Hayashi et al. ............ 359/334 |
| 6,724,524 | B1 * | 4/2004 | Evans et al. ................ 359/334 |
| 6,785,042 | B1 * | 8/2004 | Onaka et al. ............... 359/334 |
| 6,891,661 | B2 * | 5/2005 | Hayashi et al. ............ 359/334 |
| 2001/0005271 | A1 | 6/2001 | Leclerc et al. |
| 2001/0007605 | A1 | 7/2001 | Inagaki et al. |
| 2001/0009468 | A1 | 7/2001 | Fee |
| 2001/0014104 | A1 | 8/2001 | Bottorff et al. |
| 2002/0012152 | A1 | 1/2002 | Agazzi et al. |
| 2002/0015220 | A1 | 2/2002 | Papernyl et al. |
| 2002/0034197 | A1 | 3/2002 | Tometta et al. |
| 2002/0044317 | A1 | 4/2002 | Gentner et al. |
| 2002/0044324 | A1 | 4/2002 | Hoshida et al. |
| 2002/0048287 | A1 | 4/2002 | Silvers |
| 2002/0051468 | A1 | 5/2002 | Ofek et al. |
| 2002/0063948 | A1 | 5/2002 | Islam et al. |
| 2002/0064181 | A1 | 5/2002 | Ofek et al. |
| 2002/0075903 | A1 | 6/2002 | Hind |
| 2002/0080809 | A1 | 6/2002 | Nicholson et al. |
| 2005/0024714 | A1 * | 2/2005 | Hayashi et al. ............ 359/334 |

FOREIGN PATENT DOCUMENTS

JP        02238736        9/1990

OTHER PUBLICATIONS

Weik, "Fiber Optics Standard Dictionary", 3rd. ed., Chaman & Hall, New York, (1997), p. 748.*

* cited by examiner

APPARATUS AND METHOD FOR RAMAN GAIN SPECTRAL CONTROL

CROSS-REFERENCE TO RELATED APPLICATIONS

This application claims priority to Provisional Application Ser. No. 60/385,921 entitled "Method of Initial Tuning of Raman Pump Module", by Eiselt, filed Jun. 4, 2002.

TECHNIAL FIELD OF THE INVENTION

The present invention relates, in general, to the field of optical communications, and in particular to, an optical transport system that uses Raman optical amplifiers. In particular the invention teaches an apparatus and method to provide initial tuning of a Raman pump module. In the present invention, improvements to Raman gain control are taught in order to provide for an advantageous Raman gain spectral profile.

BACKGROUND OF THE INVENTION

A goal of many modem long haul optical transport systems is to provide for the efficient transmission of large volumes of voice traffic and data traffic over trans-continental distances at low costs. Various methods of achieving these goals include time division multiplexing (TDM) and wavelength division multiplexing (WDM). In time division multiplexed systems, data streams comprised of short pulses of light are interleaved in the time domain to achieve high spectral efficiency, high data rate transport. In wavelength division multiplexed systems, data streams comprised of short pulses of light of different carrier frequencies, or equivalent wavelength, co-propagate in the same fiber to achieve high spectral efficiency, high data rate transport.

The transmission medium of these systems is typically optical fiber. In addition there is a transmitter and a receiver. The transmitter typically includes a semiconductor diode laser, and supporting electronics. The laser may be directly modulated with a data train with an advantage of low cost, and a disadvantage of low reach and capacity performance. After binary modulation, a high bit may be transmitted as an optical signal level with more power than the optical signal level in a low bit. Often, the optical signal level in a low bit is engineered to be equal to, or approximately equal to zero. In addition to binary modulation, the data can be transmitted with multiple levels, although in current optical transport systems, a two level binary modulation scheme is predominantly employed.

Typical long haul optical transport dense wavelength division multiplexed (DWDM) systems transmit 40 to 80 10 channels at Gbps (gigabit per second) across distances of 3000 to 6000 km in a single 30 nm spectral band. A duplex optical transport system is one in which traffic is both transmitted and received between parties at opposite end of the link. In current DWDM long haul transport systems transmitters different channels operating at distinct carrier frequencies are multiplexed using a multiplexer. Such multiplexers may be implemented using array waveguide grating (AWG) technology or thin film technology, or a variety of other technologies. After multiplexing, the optical signals are coupled into the transport fiber for transmission to the receiving end of the link.

At the receiving end of the link, the optical channels are de-multiplexed using a de-multiplexer. Such de-multiplexers may be implemented using AWG technology or thin film technology, or a variety of other technologies. Each channel is then optically coupled to separate optical receivers. The optical receiver is typically comprised of a semiconductor photodetector and accompanying electronics.

The total link distance may in today's optical transport systems be two different cities separated by continental distances, from 1000 km to 6000 km, for example. To successfully bridge these distances with sufficient optical signal power relative to noise, the total fiber distance is separated into fiber spans, and the optical signal is periodically amplified using an in line optical amplifier after each fiber span. Typical fiber span distances between optical amplifiers are 50-100 km. Thus, for example, 30 100 km spans would be used to transmit optical signals between points 3000 km apart. Examples of inline optical amplifiers include erbium doped fiber amplifers (EDFAs) and semiconductor optical amplifiers (SOAs).

Alternatively, a Raman optical amplifier may be used to boost the optical signal power. Most Raman optical amplifiers comprise at least one high power pump laser that is launched into the fiber span. Through the nonlinear optical process of stimulated Raman scattering in the $SiO_2$ of the glass of the fiber span, this pump signal provides gain to the optical signal power. A Raman amplifier may be co-propagating or counter-propagating to the optical signal, and a common configuration is to counter-propagate the Raman pump. A Raman amplifier may be used alone, or in combination with an alternate example of an inline optical amplifier, such as an EDFA. For example, a Raman amplifier may be used in conjunction with an inline optical amplifier to accommodate high loss spans and to bring the net span loss within an allowable system dynamic range.

The gain profile of Raman gain in an optical fiber is not spectrally flat, and it would be desirable to achieve control over the Raman pump source in order to achieve a spectrally flat Raman gain. It is further desirable to be able to control the gain profile of the Raman gain in order to achieve a spectral dependence that may not necessarily be flat, but may be advantageous in other regards.

The power of the Raman pumps can be designed (e.g. by simulations) to yield flat (or arbitrarily shaped) gain for a nominal (typical) fiber span. But two parameters of the real fiber are random and unknown: 1) the wavelength dependent coupling loss between pump laser and fiber input and 2) the wavelength dependent loss of the fiber. To compensate for these unknowns, the pump powers need to be adapted.

One way to obtain the correct pump power values is to measure the spectral gain shape and adapt the power values for flat gain shape. But that requires expensive channel power monitors (measuring wavelength resolved power values) it also requires signals present at all wavelengths which may not be possible in some systems where all channels are not equiped. The present invention discloses a solution that is based on simple (overall) power measurements and only requires a single channel in the system to be active.

SUMMARY OF THE INVENTION

In the present invention, improvements to Raman gain control are taught in order to provide for an advantageous Raman gain spectral profile.

In one aspect of the invention, an apparatus to achieve a flat Raman gain profile is taught using a plurality of Raman pump lasers.

In another aspect of the invention, an apparatus to achieve an advantageously shaped Raman gain profile is taught using a plurality of Raman pump lasers.

In another aspect of the invention, a method to achieve a flat Raman gain profile is taught using a plurality of Raman pump lasers.

In another aspect of the invention, a method to achieve an advantageously shaped Raman gain profile is taught using a plurality of Raman pump lasers.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts which can be embodied in a wide variety of specific contexts. The specific embodiments described herein are merely illustrative of specific ways to make and use the invention and do not delimit the scope of the invention.

Figure 1:
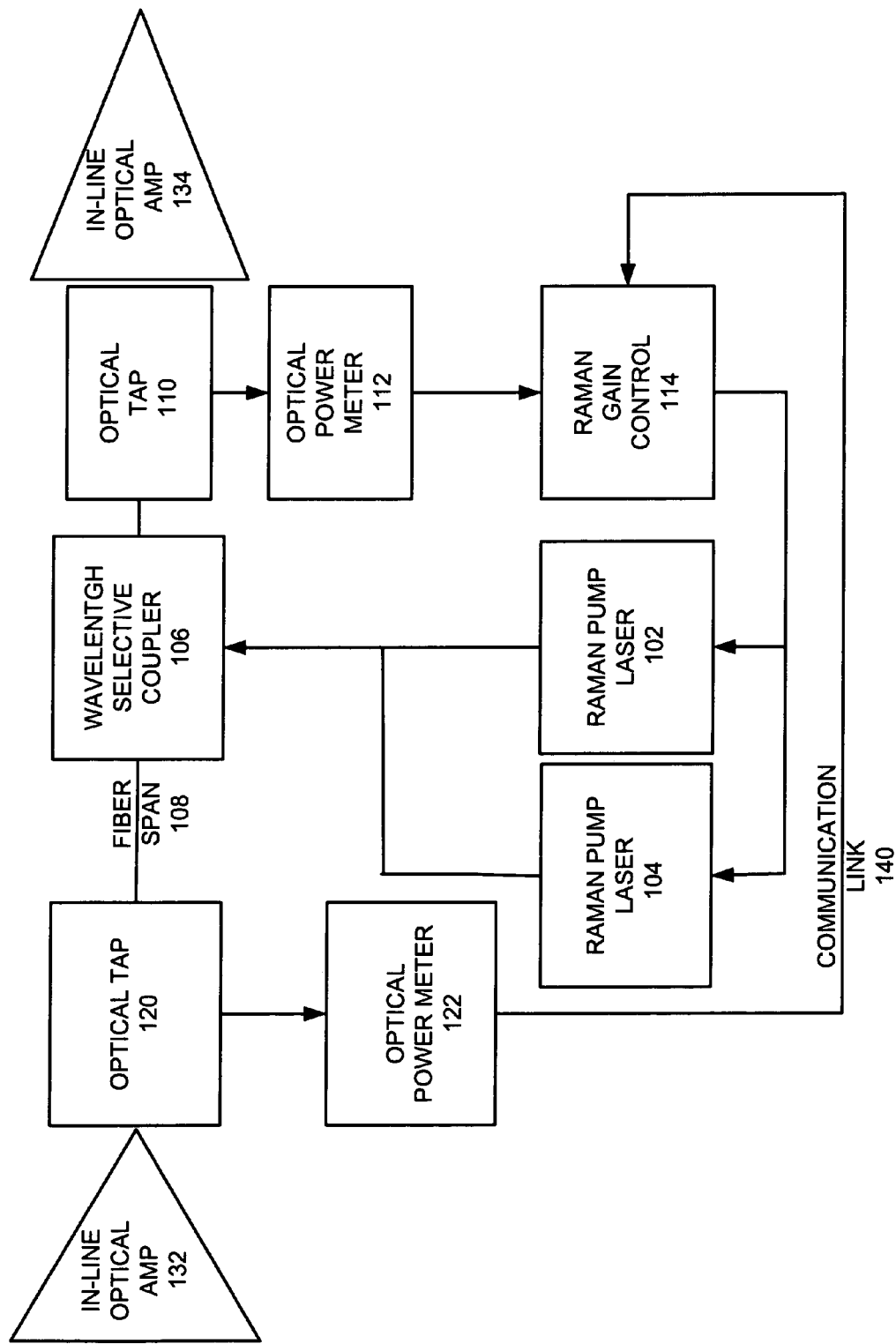
FIG. 1 is a schematic illustration of a Raman gain control apparatus to achieve an advantageously shaped Raman gain spectral profile.

In FIG. 1 is shown a block diagram of a Raman gain control apparatus to achieve an advantageously shaped Raman gain spectral profile. The Raman gain control apparatus comprises a plurality of Raman pump lasers. Shown in FIG. 1 are Raman pump laser 102 and Raman pump laser 104. Raman pump laser 102 and Raman pump laser 104 are optically coupled to wavelength selective coupler 106. Wavelength selective coupler 106 is further optically coupled to fiber span 108 and optical tap 110. The apparatus also comprises optical power meter 112, and a Raman gain control unit 114. In FIG. 1 is shown optical tap 120 and optical power meter 122. Power meter 122 is coupled to control unit 114 by communication link 140. Optical tap 120 is coupled to the opposite end of fiber span 108 from wavelength selective coupler 106. Also shown for reference in FIG. 1 is in-line optical amplifier 132 and in-line optical amplifier 134.

Raman pump laser 102 and Raman pump laser 104 may be implemented as a sufficiently powerful laser such as a high power semiconductor diode lasers, or a plurality of high power semiconductor lasers. The plurality of high power semiconductor lasers may be of the same wavelength. In the context of this invention, it will be understood that Raman pump laser 102 and Raman pump laser 104 will be purposefully at different wavelengths to provide uniform or otherwise tailored Raman gain across a broad spectrum. It should be noted that while FIG. 1. shows a preferred embodiment with two Raman pump lasers with respectively two emission wavelengths, this invention allows more than two Raman pump lasers with more than two emission wavelengths.

Wavelength selective coupler 106 may be realized as a thin film optical coupler or other technology so long as the optical coupler acts to couple the Raman pump laser signals into to fiber span 108, while allowing the optical data signal to proceed from fiber span 108 towards in-line amplifier 134. Optical fiber span 108 may be implemented using optical fiber, and in a preferred embodiment is single mode fiber such as SMF-28 or LEAF. Typical distances for fiber span 108 are 75-125 km. In a preferred embodiment of the invention, a Raman amplifier can be used on every link in the transmission system to reduce the amplifier noise figure and enable more spans for the longer fiber spans with higher losses.

Optical tap 110 and optical tap 120 may be fused couplers, or thin film couplers. Alternatively, wavelength selective coupler 106 may be a circulator. Optical power meter 112 and optical power meter 122 may be a calibrated photodiode. Raman gain control unit 114 may be a microprocessor, or microcomputer, and fulfills the feedback loop between the optical power meter 112, optical power meter 122 and Raman pump laser 120. In particular, feedback loop 140 connects optical power meter 122 and Raman gain unit 114. In a preferred embodiment, feedback loop 140 may be implemented though the optical service channel of the optical transport system. Examples of inline optical amplifier 132 and optical amplifier 134 include erbium doped fiber amplifiers (EDFAs) and semiconductor optical amplifiers (SOAs). Potentially a discrete Raman amplifier may also be used for in-line optical amplifier 132 and in-line optical amplifier 134.

FIG. 1 may now be used to understand the operation of the invention to control the spectral dependence of the Raman gain. For example, to achieve a spectrally flat gain, two pump wavelengths may be used with the correct relative power ratio between Raman pump laser 102 and Raman pump laser 104. However, power losses in the pump coupling components, for example wavelength selective coupler 106 and fiber losses, can be wavelength dependent, causing the signal from Raman pump laser 102 to be attenuated differently than the signal from Raman pump laser 104. If the relative pump launch powers are not adjusted to take into account these loss variations, this can lead to a non-flat Raman gain spectrum.

Consider first the case where both Raman pump laser 102 and Raman pump laser 104 are turned off. For an optical signal, at λ signal traveling from optical tap 120 to optical tap 110, the inherent loss in the fiber span is equal to $L_0 = P_1/P_2$ where $P_2$ is the power as measured in optical power meter 112 and $P_1$ is the power as measured in optical power meter 122. Raman gain control unit 114 is programmed to calculate $L_0$ based on power measurements from optical power meter 112 and optical power meter 122 when Raman pump laser 102 and 104 are off.

The second case is where Raman pump laser 102, operating at wavelength $\lambda_1$ is turned on with power $P_L(\lambda_1)$. The power of the optical signal is again measured with optical power meter 112 and optical power meter 122. The loss in the fiber span is again calculated as $L_1 = P_1/P_2$. Due to the gain from the Raman pump laser 102, $L_1$ is smaller than $L_0$. After coupling losses $L_c(\lambda_1)$, the Raman pump power coupled into fiber span 108 is $L_c(\lambda_1)P_L(\lambda_1)$. Theoretically, the Raman gain due to the presence of Raman pump laser 102 is given by the expression:

$$G_1 = \exp[g_{fiber} r(\lambda_{signal} - \lambda_1) L_C(\lambda_1) P_L(\lambda_1) L_{eff}(\lambda_1)]$$

where $g_{fiber}$ is the power normalized peak Raman gain coefficient of fiber span 108, and $r(\lambda_{signal} - \lambda_1)$ is the relative gain coefficient at the wavelength separation $\lambda_{signal} - \lambda_1$. In practice the value of $G_1 = L_0/L_1$. The power meter measurements provide a value $G_1$ to Raman gain control unit 114. Leff($\lambda_1$) is the effective fiber length at wavelength $\lambda_1$, which is calculated as $L_{eff}(\lambda_1) = (1 - \exp(-\alpha(\lambda_1) * L_{fiber}))/\alpha(\lambda_1)$, where $L_{fiber}$ is the length of the fiber span and $\alpha(\lambda_1)$ is the fiber attenuation coefficient at wavelength $\lambda_1$.

The third case occurs as Raman pump laser 102 is turned off and Raman pump laser 104 is turned on, operating at wavelength $\lambda_2$ with power $P_L(\lambda_2)$. The power of the optical signal is again measured with optical power meter 110 and optical power meter 122. The loss in the fiber span is now calculated as $L_2=P_1/P_2$. Due to the gain from the Raman pump laser 104, $L_2$ is smaller than $L_0$. After coupling losses $L_c(\lambda_2)$, the Raman pump power coupled into fiber span 108 is $L_c(\lambda_2)P_L(\lambda_2)$. Theoretically, the Raman gain due to the presence of Raman pump laser 104 is given by the expression:

$$G_2=\exp[g_{fiber}r(\lambda_{signal}-\lambda_2)L_C(\lambda_2)P_L(\lambda_2)L_{eff}(\lambda_2)]$$

where $g_{fiber}$ is the power normalized peak Raman gain coefficient of fiber span 108, and $r(\lambda_{signal}-\lambda_2)$ is the relative gain coefficient at the wavelength separation $\lambda_{signal}-\lambda_2$. $L_{eff}(\lambda_2)$ is the effective fiber length at wavelength $\lambda_2$, which is calculated as $L_{eff}(\lambda_2)=(1-\exp(-\alpha(\lambda_2)*L_{fiber}))/\alpha(\lambda_2)$, where $L_{fiber}$ is the length of the fiber span and $\alpha(\lambda_2)$ is the fiber attenuation coefficient at wavelength $\lambda_2$. In practice the value of $G_2=L_0/L_2$. The power meter measurements provide a value $G_2$ to Raman gain control unit 114.

From $G_1$ and $G_2$, Raman gain control unit 114 will now calculate the ratio between the coupling and fiber losses for the two pump wavelengths:

$$\frac{L_{eff}(\lambda_1)L_C(\lambda_1)}{L_{eff}(\lambda_2)L_C(\lambda_2)} = \frac{\ln(G_1)r(\lambda_{signal}-\lambda_1)}{\ln(G_2)r(\lambda_{signal}-\lambda_2)}\frac{P_L(\lambda_1)}{P_L(\lambda_2)}$$

"r" is the Raman coefficient and is taken as a known value which is independent of fiber type. Raman gain control unit 114 will use this loss ratio to adjust the relative power of Raman pump laser 102 to Raman pump laser 104 to yield a correct power ratio in fiber span 108 to achieve a flat Raman gain spectrum. The optimum ratio of the pump powers is determined based on simulations. These ratios depend on the fiber type, the wavelength range, span lengths and other parameters. The method described is used to ensure that these power ratios are true at the input to the fiber and also takes into account varying wavelength dependent span losses.

As will be clear to one skilled in the art, if it is advantageous produce a tilted Raman gain spectrum, with higher gain at either $\lambda_1$ or $\lambda_2$ then Raman gain control unit 114 can be programmed to adjust the relative powers to provide a tilted Raman gain spectrum. Additional Raman pump lasers and additional G measurements provide additional data to Raman control unit 114 and may be used to provide more complicated Raman spectral gain profiles.

Figure 2:
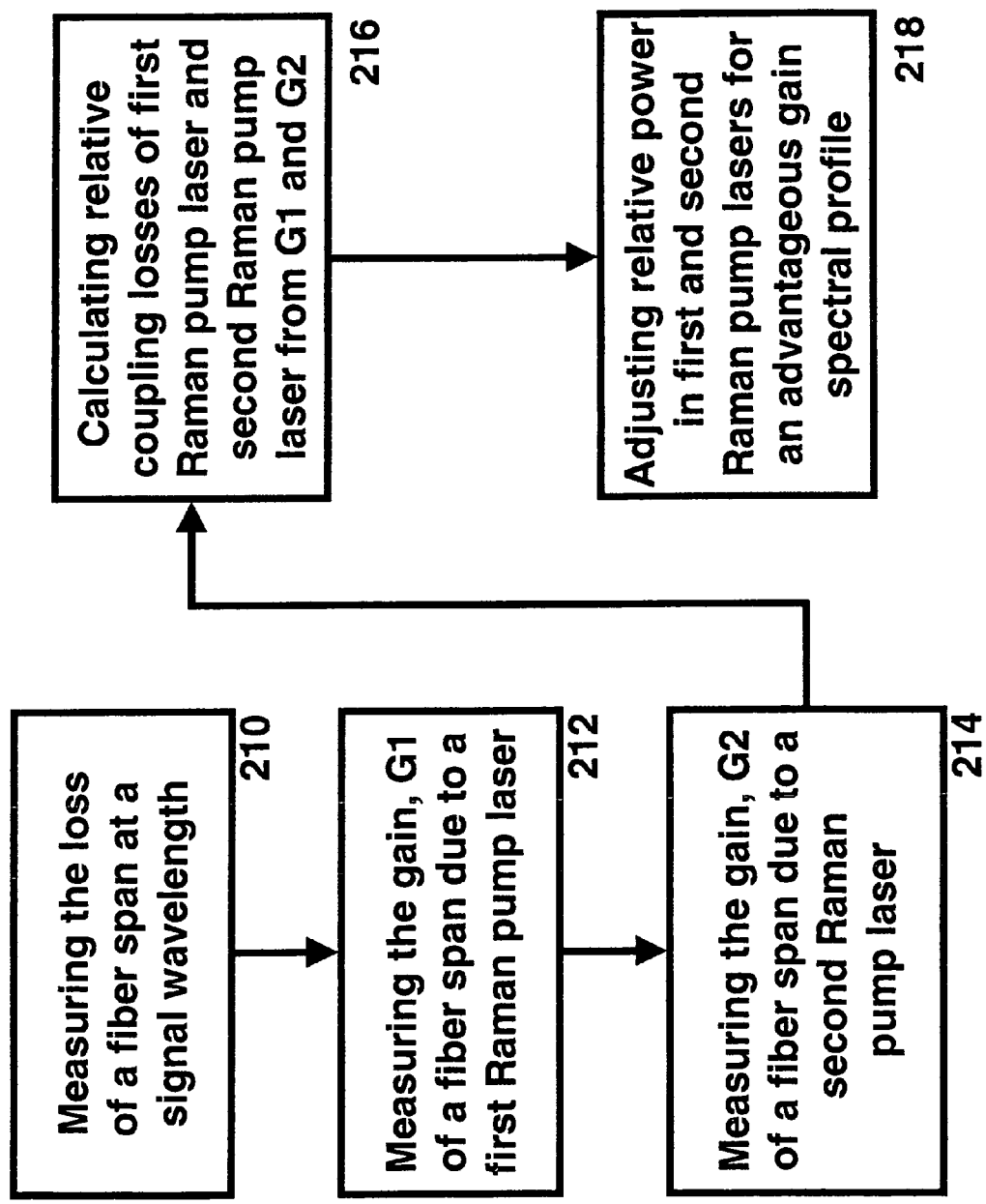
FIG. 2 is a flow chart of a Raman gain control method to achieve an advantageously shaped Raman gain spectral profile.

In FIG. 2 is a flow chart illustrating a method of Raman gain control in accordance with one aspect of the invention. The method comprises a first step 210 of measuring the inherent loss of a fiber span 108 at a signal wavelength. For an optical signal traveling from optical tap 120 to optical tap 110, the inherent loss in the fiber span is equal to $L_0=P_1/P_2$ where $P_2$ is the power as measured in optical power meter 112 and $P_1$ is the power as measured in optical power meter 122. Raman gain control unit 114 is programmed to calculate $L_0$ based on power measurements from optical power meter 112 and optical power meter 122.

The method further comprises a second step 212 of measuring the gain, $G_1$ of a fiber span due to a first Raman pump laser 102. Raman pump laser 102, operating at wavelength $\lambda_1$ is turned on with power $P_L(\lambda_1)$. The power of the optical signal is again measured with optical power meter 112 and optical power meter 122. The loss in the fiber span is now calculated as $L_1=P_1/P_2$. Due to the gain from the Raman pump laser 102, $L_1$ is smaller than $L_0$. After coupling losses $L_c(\lambda_1)$, the Raman pump power coupled into fiber span 108 is $L_c(\lambda_1)P_L(\lambda_1)$. Theoretically, the Raman gain due to the presence of Raman pump laser 102 is given by the expression:

$$G_1=\exp[g_{fiber}r(\lambda_{signal}-\lambda_1)L_C(\lambda_1)P_L(\lambda_1)L_{eff}(\lambda_1)]$$

where $g_{fiber}$ is the power normalized peak Raman gain coefficient of fiber span 108, and $r(\lambda_{signal}-\lambda_1)$ is the relative gain coefficient at the wavelength separation $\lambda_{signal}-\lambda_1$. $L_{eff}(\lambda_1)$ is the effective fiber length at wavelength $\lambda_1$, which is calculated as $L_{eff}(\lambda_1)=(1-\exp(-\alpha(\lambda_1)*L_{fiber}))/\alpha(\lambda_1)$, where $L_{fiber}$ is the length of the fiber span and $\alpha(\lambda_1)$ is the fiber attenuation coefficient at wavelength $\lambda_1$. In practice the value of $G_1=L_0/L_1$. The power meter measurements provide a value $G_1$ to Raman gain control unit 114.

Step 214 of the method entails measuring the gain, $G_2$ of a fiber span due to a second Raman pump laser 104. Raman pump laser 102 is now turned off, and Raman pump laser 104, operating at wavelength $\lambda_2$ is turned on with power $P_L(\lambda_2)$. The power of the optical signal is again measured with optical power meter 112 and optical power meter 122. The loss in the fiber span is now calculated as $L_1=P_1/P_2$. Due to the gain from the Raman pump laser 102, $L_1$ is smaller than $L_0$. After coupling losses $L_c(\lambda_2)$, the Raman pump power coupled into fiber span 108 is $L_c(\lambda_2)P_L(\lambda_2)$. Theoretically, the Raman gain due to the presence of Raman pump laser 104 is given by the expression:

$$G_2=\exp[g_{fiber}r(\lambda_{signal}-\lambda_2)L_C(\lambda_2)P_L(\lambda_2)L_{eff}(\lambda_2)]$$

where $g_{fiber}$ is the power normalized peak Raman gain coefficient of fiber span 108, and $r(\lambda_{signal}-\lambda_2)$ is the relative gain coefficient at the wavelength separation $\lambda_{signal}-\lambda_2$. $L_{eff}(\lambda_2)$ is the effective fiber length at wavelength $\lambda_2$, which is calculated as $L_{eff}(\lambda_2)=(1-\exp(-\alpha(\lambda_2)*L_{fiber}))/\alpha(\lambda_2)$, where $L_{fiber}$ is the length of the fiber span and $\alpha(\lambda_2)$ is the fiber attenuation coefficient at wavelength $\lambda_2$. In practice, $G_2=L_0/L_1$. The power meter measurements provide a value $G_2$ to Raman gain control unit 114.

Step 216 of the method entails Calculating relative coupling losses of first Raman pump laser and second Raman pump laser from $G_1$ and $G_2$. From $G_1$ and $G_2$, Raman gain control unit 114 will now calculate the ratio between the coupling and fiber losses for the two pump wavelengths:

$$\frac{L_{eff}(\lambda_1)L_C(\lambda_1)}{L_{eff}(\lambda_2)L_C(\lambda_2)} = \frac{\ln(G_1)r(\lambda_{signal}-\lambda_1)}{\ln(G_2)r(\lambda_{signal}-\lambda_2)}\frac{P_L(\lambda_1)}{P_L(\lambda_2)}$$

"r" is the Raman coefficient and is taken as a known value which is independent of fiber type. Step 218 of the method entails Adjusting relative power in first and second Raman pump lasers for an advantageous gain spectral profile. Raman gain control unit 114 will use this loss ratio to adjust the relative power of Raman pump laser 102 to Raman pump laser 104 to yield a correct power ratio in fiber span 108 to achieve a flat Raman gain spectrum. The optimum ratio of the pump powers is determined based on simulations. These ratios depend on the fiber type, the wavelength range, span lengths and other parameters. The method described in the application is used to ensure that these power ratios are true at the input to the fiber and also takes into account varying wavelength dependent span losses.

As will be clear to one skilled in the art, if it is advantageous produce a tilted Raman gain spectrum, with higher gain at either $\lambda_1$ or $\lambda_2$ then Raman gain control unit 114 can be programmed to adjust the relative powers to provide a tilted Raman gain spectrum. Additional Raman pump lasers, and additional G measurements provide additional data to Raman control unit 114 and may be used to provide more complicated Raman spectral gain profiles.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

The invention claimed is:

1. A Raman gain spectral control system comprising:
  a fiber span having a first end and a second end;
  a first Raman pump laser and a second Raman pump laser, each in communication with the fiber span; and
  a Raman gain control unit in communication with the first and second Raman pump lasers,
  wherein the Raman gain control unit is configured to calculate a first gain resulting from a presence of the first Raman pump laser and an absence of the second Raman pump laser,
  wherein the Raman gain control unit is configured to calculate a second gain resulting from an absence of the first Raman pump laser and a presence of the second Raman pump laser,
  wherein the Raman gain control unit is configured to calculate relative coupling losses due to at least one of the first or second Raman pump lasers based on the calculated first and second gains, and
  wherein the Raman gain control unit is configured to adjust at least one of the first or second Raman pump lasers in accordance with the calculated relative coupling losses to achieve a particular Raman gain spectrum.

2. The system of claim 1, wherein the particular Raman gain spectrum is predominantly flat across a predetermined spectral range.

3. The system of claim 1, wherein the particular Raman gain spectrum is predominantly tilted across a predetermined spectral range.

4. The system of claim 1, wherein the Raman gain control unit is configured to read a first optical power meter and a second optical power meter with the first Raman pump laser turned on and the second Raman pump laser turned off.

5. The system of claim 1, wherein the Raman gain control unit is configured to read a first optical power meter and a second optical power meter with the first Raman pump laser turned off and the second Raman pump laser turned on.

6. The system of claim 1, wherein the Raman gain control unit is further configured to:
  measure a first span loss with the first and second Raman pump lasers turned off;
  measure a second span loss with the first Raman pump laser turned on and the second Raman pump laser turned off;
  measure a third span loss with the first Raman pump laser turned off and the second Raman pump laser turned on;
  calculate the first gain by dividing the first span loss by the second span loss;
  calculate the second gain by dividing the first span loss by the third span loss; and
  adjust the first and second Raman pump lasers based on the first and second gains.

7. The system of claim 1, wherein a relative power of the first Raman pump laser and the second Raman pump laser is determined by the expression:

$$\frac{L_{eff}(\lambda_1)L_C(\lambda_1)}{L_{eff}(\lambda_2)L_C(\lambda_2)} = \frac{\ln(G_1)r(\lambda_{signal}-\lambda_1)}{\ln(G_2)r(\lambda_{signal}-\lambda_2)}\frac{P_L(\lambda_1)}{P_L(\lambda_2)}$$

where
$\lambda_1$=operating wavelength of the first Raman pump laser;
$G_1$=gain relative to the first Raman pump laser;
$G_2$=gain relative to the second Raman pump laser;
$g_{fiber}$=power normalized peak Raman gain coefficient of the fiber;
r=relative gain coefficient;
$P_L$=Raman pump power;
$L_c$=coupling loss;
$\lambda_{signal}$=wavelength of the signal;
$\lambda_2$=operating wavelength of the second Raman pump laser; and,
$L_{eff}$=effective fiber length.

8. The system of claim 1, wherein a signal from the first Raman pump laser and a signal from the second Raman pump laser are each counter-propagating relative to an optical signal on the fiber span.

9. The system of claim 1, wherein a signal from the first Raman pump laser and a signal from the second Raman pump laser are each co-propagating relative to an optical signal on the fiber span.

10. The system of claim 1, further comprising a coupler coupled to the fiber span, wherein the coupler is configured to couple at least one of the first Raman pump laser or the second Raman pump laser to the fiber span.

11. The system of claim 1, further comprising:
  a first optical power meter in communication with the first end of the fiber span and with the Raman gain control unit, wherein the first optical power meter is configured to measure a first power; and
  a second optical power meter in communication with the second end of the fiber span and with the Raman gain control unit, wherein the second optical power meter is configured to measure a second power.

12. The system of claim 11, wherein the Raman gain control unit is configured to calculate a fiber span loss by dividing the first power by the second power.

13. A method of Raman gain spectral control, the method comprising:
  transmitting an optical signal in a fiber span;
  measuring a first fiber span loss;
  transmitting a first Raman pump signal at a first wavelength in the fiber span;
  measuring a first gain due to the first Raman pump signal;
  removing the first Raman pump signal from the fiber span;
  transmitting a second Raman pump signal at a second wavelength in the fiber span;
  measuring a second gain due to the second Raman pump signal;
  calculating relative coupling losses due to at least one of the first or second Raman pump signals; and
  adjusting a power of at least one of the first or second Raman pump signals in accordance with the calculated relative coupling losses to achieve a particular Raman gain spectrum.

14. The method of claim 13, wherein the particular Raman gain spectrum is predominantly flat across a spectral range.

15. The method of claim 13, wherein the particular Raman gain spectrum is predominantly tilted across a spectral range.

16. The method of claim 13, further comprising automatically adjusting the power of at least one of the first or second Raman pump signals to achieve the particular Raman gain spectrum.

17. The method of claim 13, wherein measuring the first fiber span loss comprises:
measuring a first power at a first end of the fiber span;
measuring a second power at a second end of the fiber span; and
dividing the first power by the second power.

18. The method of claim 13, wherein measuring the first gain comprises:
measuring a first power at a first end of the fiber span;
measuring a second power at a second end of the fiber span;
calculating a second fiber span loss by dividing the first power by the second power; and
dividing the first fiber span loss by the second fiber span loss.

19. The method of claim 13, wherein measuring the second gain comprises:
measuring a first power at a first end of the fiber span;
measuring a second power at a second end of the fiber span;
calculating a second fiber span loss by dividing the first power by the second power; and
dividing the first fiber span loss by the second fiber span loss.

20. A system for controlling the Raman gain of a signal, the system comprising:
a fiber span;
a first tap connected to a first end of the fiber span;
a second tap connected to a second end of the fiber span;
an optical coupler connected to the fiber span;
a first optical power meter connected to the first tap;
a second optical power meter connected to the second tap;
a first Raman pump laser and a second Raman pump laser, each connected to the optical coupler; and
a microprocessor connected to the first and second optical power meters and the first and second Raman pump lasers,
wherein the microprocessor is configured to calculate relative coupling losses due to at least one of the first or second Raman pump lasers based on an output of each of the first and second optical power meters,
wherein the microprocessor is configured to adjust an output of at least one of the first or second Raman pump lasers in accordance with the calculated relative coupling losses to achieve a predetermined gain spectrum, and
wherein the microprocessor is configured to calculate the relative coupling losses by calculating a first gain resulting from a presence of the first Raman pump laser and an absence of the second Raman pump laser and by calculating a second gain resulting from an absence of the first Raman pump laser and a presence of the second Raman pump laser.

21. The system of claim 20, wherein the predetermined gain spectrum is approximately flat.

22. The system of claim 20, wherein the predetermined gain spectrum is approximately tilted.

23. The system of claim 20, wherein the microprocessor is configured to calculate the relative coupling losses based on the output of each of the first and second Raman pump lasers under the following conditions:
first, when the first and second Raman pump lasers are off;
second, when the first Raman pump laser is off and the second Raman pump laser is on; and
third, when the first Raman pump laser is on and the second Raman pump laser is off.

24. The system of claim 20, wherein the microprocessor is configured to use a ratio of the output of each of the first and second Raman pump lasers to achieve the predetermined gain spectrum.

25. A method for controlling spectral gain, the method comprising:
measuring a first gain of an optical signal based on a first Raman pump laser;
turning off the first Raman pump laser;
measuring a second gain of the optical signal based on a second Raman pump laser;
calculating relative coupling losses due to at least one of the first or second Raman pump lasers; and
adjusting at least one of the first or second Raman pump lasers in accordance with the calculated relative coupling losses to achieve a particular Raman gain spectrum.

26. The method of claim 25, further comprising measuring the first and second gains based on an inherent loss in a fiber span.

27. The method of claim 25, wherein adjusting at least one of the first or second Raman pump lasers is based on at least one of the following: a fiber, a wavelength range, or a span length.

28. The method of claim 25, further comprising:
measuring a first power at a first end of a fiber span;
measuring a second power at a second end of the fiber span; and
dividing the first power by the second power to yield a first fiber span loss.

29. The method of claim 28, wherein measuring the first gain comprises:
measuring a third power at the first end of the fiber span;
measuring a fourth power at the second end of the fiber span;
dividing the third power by the fourth power to yield a second fiber span loss; and
dividing the first fiber span loss by the second fiber span loss.

30. The method of claim 29, wherein measuring the second gain comprises:
measuring a fifth power at the first end of the fiber span;
measuring a sixth power at the second end of the fiber span;
dividing the fifth power by the sixth power to yield a third fiber span loss; and
dividing the first fiber span loss by the third fiber span loss.

* * * * *